(12) United States Patent
Tang (10) Patent No.: US 11,102,795 B2
(45) Date of Patent: Aug. 24, 2021

(54) DATA GENERATION METHOD, METHOD FOR CONFIGURING LOGICAL CHANNEL, TERMINAL DEVICE AND CHIP

(71) Applicant: Guangdong OPPO Mobile Telecommunications Corp., Ltd., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/805,597

(22) Filed: Feb. 28, 2020

(65) Prior Publication Data

US 2020/0205164 A1 Jun. 25, 2020

Related U.S. Application Data

(63) Continuation of application No. PCT/CN2018/084271, filed on Apr. 24, 2018.

(30) Foreign Application Priority Data

Sep. 27, 2017 (WO) ............... PCT/CN2017/103763
Apr. 4, 2018 (WO) ............... PCT/CN2018/082046

(51) Int. Cl.
*H04W 72/08* (2009.01)
*H04W 72/10* (2009.01)
(Continued)

(52) U.S. Cl.
CPC ......... *H04W 72/087* (2013.01); *H04W 72/10* (2013.01); *H04W 80/02* (2013.01); *H04W 92/18* (2013.01)

(58) Field of Classification Search
CPC ... H04W 72/087; H04W 72/10; H04W 80/02; H04W 92/18
(Continued)

(56) References Cited

U.S. PATENT DOCUMENTS 8,200,232 B2 6/2012 Lee
8,488,540 B2 7/2013 Yi
(Continued)

FOREIGN PATENT DOCUMENTS

CN 101132619 A 2/2008
CN 101414960 A 4/2009
(Continued)

OTHER PUBLICATIONS

International search report for PCT/CN2017/103763, dated Jun. 19, 2018.
(Continued)

*Primary Examiner* — Nghi H Ly
(74) *Attorney, Agent, or Firm* — Perkins Coie LLP (57) ABSTRACT

A data generation method, a method for configuring logical channel, a terminal device, and a chip are provided. The terminal device has m logical channels and a plurality of carriers, each of the m logical channels is configured with a priority, each of the plurality of carriers is correlated to a priority of at least one of the m logical channels, and m>0.

(Continued)

The method comprises: receiving RLC data on n logical channels, wherein the n logical channels belong to the m logical channels, and m≥n>0; determining k logical channels in the n logical channels according to priorities of the n logical channels and a priority correlated to a first carrier in the plurality of carriers, wherein n≥k>0; and generating a MAC protocol data unit PDU, wherein the MAC PDU comprises RLC PDUs on the k logical channels. The terminal device can determine a carrier for transmitting the MAC PDU.

14 Claims, 3 Drawing Sheets

(51) Int. Cl.
  *H04W 80/02* (2009.01)
  *H04W 92/18* (2009.01)
(58) Field of Classification Search
  USPC ............... 370/329, 328, 338, 341, 345, 350
  See application file for complete search history.

(56) References Cited

U.S. PATENT DOCUMENTS

| | | | |
|---|---|---|---|
| 9,019,926 | B2 | 4/2015 | Yi et al. |
| 9,839,043 | B2 | 12/2017 | Yi et al. |
| 10,271,232 | B2* | 4/2019 | Marinier ................ H04L 5/001 |
| 10,321,419 | B2* | 6/2019 | Kim ...................... H04W 76/28 |
| 10,491,341 | B2* | 11/2019 | Martin .................. H04L 1/1893 |
| 2011/0038333 | A1 | 2/2011 | Yi |
| 2011/0039558 | A1 | 2/2011 | Lee |
| 2013/0064131 | A1* | 3/2013 | Kwon .................. H04L 5/0007 370/252 |
| 2013/0286984 | A1 | 10/2013 | Yi et al. |
| 2014/0241265 | A1 | 8/2014 | Pragada |
| 2015/0201426 | A1 | 7/2015 | Yi et al. |

FOREIGN PATENT DOCUMENTS

| | | |
|---|---|---|
| CN | 102036390 A | 4/2011 |
| CN | 102123512 A | 7/2011 |
| CN | 102474874 A | 5/2012 |
| CN | 102036390 B | 12/2014 |
| CN | 106658728 A | 5/2017 |
| WO | 2013009635 A2 | 1/2013 |

OTHER PUBLICATIONS

International search report for PCT/CN2018/084271, dated Jul. 16, 2018.
Catt, R2-1708052, "Carrier configuration and carrier selection in eV2X CA", 3GPP TSG-RAN WG2 #99, Berlin, Germany, Aug. 25, 2017.
LG Elecronics Inc., R2-165839, "Support for V2V services based on LTE sidelink", 3GPP TSG-RAN WG2 Meeting #95, Gothenbur, Sweden, Aug. 26, 2016.
Oppo, R2-1708039, "Discussion on Service and Carrier Mapping for PC5 CA in eV2X", 3GPP TSG-RAN WG2#99, Berlin, Gerrmany, Aug. 26, 2017.
LG Electronics Inc., R2-1709301, "Carrier selection for carrier aggregation", 3GPP TSG-RAN WG2 Meeting #99, Berlin, Germany, Aug. 25, 2017.
Oppo, R2-1707701, "Resource selection in CA-based eV2x", 3GPP TSG-RAN2 Meeting #99, Berlin, Germany, Aug. 25. 2017.
Huawei Hisilicon, R2-1704605, "PDCP Duplication for CA case", 3GPP TSG-RAN2 Meeting #98, Hangzhou, China, May 19, 2017.
Interdigital Inc., R2-1708727, "LCH Selection in LCP based on TTI Duration", 3GPP TSG-RAN WG2 #99, Berlin, Germany, Aug. 25, 2017.
Huawei et al. RP-171069 "Revision of WI: V2X phase 2 based on LTE", Jun. 5-8, 2017, 6 pages.
Huawei Rapporteur, R2-1710089, "Summary of [99#48][eV2X] Selection of Tx Carriers", 3GPP_TSG_RAN2_WG2@LIST. ETSI.ORG, Prague, Czech Republic, Oct. 9-13, 2017.
Supplementary European Search Report in the European application No. 18862345.8, dated Oct. 9, 2020.
English translation of the Written Opinion of the International Search Authority in the international application No. PCT/CN2018/ 084271, dated Jul. 16, 2018.
English translation of the Written Opinion of the International Search Authority in the international application No. PCT/CN2017/ 103763, dated Jun. 19, 2018.
3GPP TSG-RAN WG2#NR_AdHoc#2 Meeting R2-1707101, Qingdao, China, Jun. 27-29, 2017; Agenda item: 10.3.1.6; Source: Samsung; Title: BSR for Multiple Numerology Operation.
First Office Action of the Chinese application No. 202010071998.X, dated Apr. 27, 2021.
Office Action of the Indian application No. 202017016691, dated Jun. 27, 2021.
First Office Action of the Chilean application No. 202000752, dated May 20, 2021.

* cited by examiner

DATA GENERATION METHOD, METHOD FOR CONFIGURING LOGICAL CHANNEL, TERMINAL DEVICE AND CHIP

CROSS-REFERENCES TO RELATED APPLICATIONS

This application is a continuation of and claims priority to International Patent Application PCT/CN2018/084271, filed on Apr. 24, 2018, which claims priority to International Patent Applications PCT/CN2017/103763, filed on Sep. 27, 2017 and PCT/CN2018/082046, filed on Apr. 4, 2018, the contents of which are hereby incorporated by reference in their entirety.

BACKGROUND OF THE INVENTION

Technical Field

Embodiments of the present invention relate to the communications field, and more specifically, to a data generation method, a method for configuring a logical channel, a terminal device, and a chip.

Related Art

The internet of vehicles system uses a sidelink (SL) transmission technology based on long term evaluation vehicle to vehicle (LTE V2V). Different from a conventional LTE system in which communications data is received or sent by using a base station, the internet of vehicles system uses terminal-to-terminal direct communication, and therefore has higher spectrum efficiency and a lower transmission delay.

Figure 1:
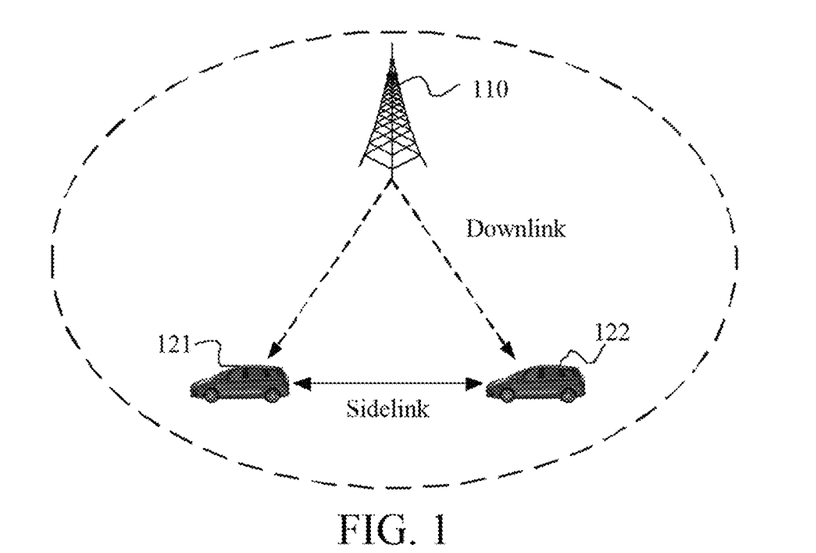
FIG. 1 is a schematic block diagram of a transmission mode according to an embodiment of the present invention.
Figure 2:
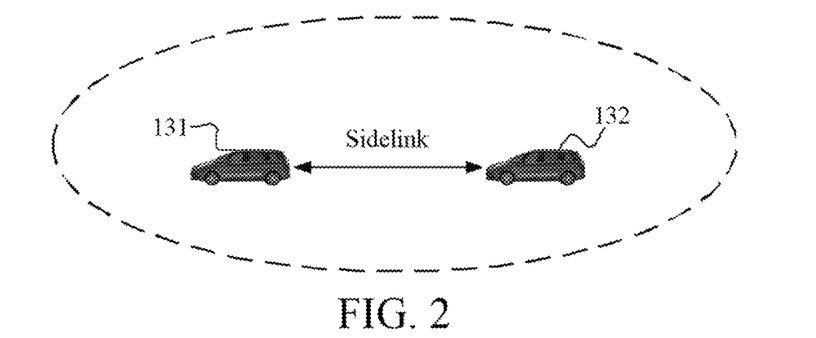
FIG. 2 is a schematic block diagram of another transmission mode according to an embodiment of the present invention.

In 3rd Generation Partnership Project (3GPP) Rel-14, vehicle to everything (V2X) is standardized, and two transmission modes, namely, a mode 3 and a mode 4, are defined. Specifically, in the mode 3, as shown in FIG. 1, transmission resources of vehicle terminals (a vehicle terminal 121 and a vehicle terminal 122) are allocated by a base station 110. The vehicle terminals send data on a sidelink according to the resources allocated by the base station 110. The base station 110 may allocate resources for a single transmission or resources for a semi-static transmission to the terminals. In the mode 4, as shown in FIG. 2, vehicle terminals (a vehicle terminal 131 and a vehicle terminal 132) use a transmission manner of sensing (sensing) and reservation (reservation). Specifically, the terminal independently selects a transmission resource from resources on a sidelink to generate data. However, with the evolution of the mobile internet of things technology (for example, Rel.15), enhancement of vehicle-to-everything (eV2X) is extended to a multi-carrier scenario, that is, a terminal device can receive and send data simultaneously on more than one carrier.

Therefore, how to select a carrier is an urgent problem to be resolved.

SUMMARY OF THE INVENTION

A data generation method, a method for configuring logical channel, a terminal device, and a chip are provided, so that in a MAC PDU packaging process, the terminal device can determine a carrier for transmitting the MAC PDU.

According to a first aspect, a data generation method is provided. The method is applied to a terminal device, wherein the terminal device has m logical channels and a plurality of carriers, each of the m logical channels is configured with a priority, each of the plurality of carriers is correlated to a priority of at least one of the m logical channels, and m>0; and the method includes receiving radio link control RLC data on n logical channels, wherein the n logical channels belong to the m logical channels, and m≥n>0; determining k logical channels in the n logical channels according to priorities of the n logical channels and a priority correlated to a first carrier in the plurality of carriers, wherein n≥k>0; and generating a media access control MAC protocol data unit PDU, wherein the MAC PDU comprises RLC PDUs on the k logical channels.

In this embodiment of the present invention, when receiving the RLC data on the n logical channels, the terminal device can select the k logical channels from the n logical channels according to the priorities of the n logical channels and the priority correlated to the first carrier in the plurality of carriers of the terminal device, and then generates the MAC PDU transmitted on the first carrier.

In some possible implementations, the determining k logical channels in the n logical channels according to priorities of the n logical channels and a priority correlated to a first carrier in the plurality of carriers comprises determining the k logical channels in the n logical channels, wherein a priority of each of the k logical channels belongs to the priority correlated to the first carrier.

In some possible implementations, when a priority correlated to a second carrier in the plurality of carriers comprises a priority of a first logical channel in the m logical channels, the priority correlated to the second carrier further comprises a priority that is of a logical channel in the m logical channels and that is lower than the priority of the first logical channel.

In this embodiment of the present invention, a priority correlated to each of the plurality of carriers of the terminal device is designed with reference to a packaging rule of a MAC PDU in the prior art. In this way, a current MAC PDU generation process can remain unchanged, thereby improving compatibility of the present invention and the prior to the maximum extent.

In some possible implementations, the determining k logical channels in the n logical channels according to priorities of the n logical channels and a priority correlated to a first carrier in the plurality of carriers comprises determining a second logical channel in the n logical channels, wherein a priority of the second logical channel belongs to the priority correlated to the first carrier; and determining the k logical channels according to the priority of the second logical channel.

In some possible implementations, the determining the k logical channels according to the priority of the second logical channel comprises determining, in the n logical channels, logical channels having priorities lower than the priority of the second logical channel as the k logical channels.

In some possible implementations, the determining the k logical channels according to the priority of the second logical channel comprises determining, in the n logical channels, logical channels having priorities higher than the priority of the second logical channel as the k logical channels.

In some possible implementations, priorities correlated to the plurality of carriers do not overlap.

In some possible implementations, the determining k logical channels in the n logical channels according to priorities of the n logical channels and a priority correlated to a first carrier in the plurality of carriers comprises determining the k logical channels in the n logical channels, wherein a priority of each of the k logical channels is lower than the priority correlated to the first carrier.

In some possible implementations, the determining k logical channels in the n logical channels according to priorities of the n logical channels and a priority correlated to a first carrier in the plurality of carriers comprises determining the k logical channels in the n logical channels, wherein a priority of each of the k logical channels is higher than the priority correlated to the first carrier.

In some possible implementations, each of the plurality of carriers is merely correlated to one priority.

In some possible implementations, the priority correlated to each of the plurality of carriers is a priority configured by a network device In some possible implementations, the priority correlated to each of the plurality of carriers is a preconfigured priority.

In some possible implementations, the method further comprises determining, according to a channel busy ratio of the first carrier and a first threshold, whether carrier re-election is allowed.

In some possible implementations, a priority of each logical channel is correlated to one threshold.

In some possible implementations, the first threshold is a maximum value of thresholds correlated to priorities of the k logical channels.

In some possible implementations, the first threshold is a minimum value of thresholds correlated to priorities of the k logical channels.

In some possible implementations, the first threshold is a maximum value of a threshold correlated to the priority of the first carrier.

In some possible implementations, the first threshold is a minimum value of a threshold correlated to the priority of the first carrier.

In some possible implementations, the first threshold is a maximum value of thresholds correlated to the following priorities: the priority correlated to the first carrier, and a priority lower than the priority correlated to the first carrier.

In some possible implementations, the first threshold is a minimum value of thresholds correlated to the following priorities: the priority correlated to the first carrier, and a priority lower than the priority correlated to the first carrier.

In some possible implementations, the first threshold is a maximum value of thresholds correlated to the following priorities: the priority correlated to the first carrier, and a priority higher than the priority correlated to the first carrier.

In some possible implementations, the first threshold is a minimum value of thresholds correlated to the following priorities: the priority correlated to the first carrier, and a priority higher than the priority correlated to the first carrier.

In some possible implementations, the determining k logical channels in the n logical channels according to priorities of the n logical channels and a priority correlated to a first carrier in the plurality of carriers comprises determining a third logical channel and a fourth logical channel in the n logical channels, wherein the third logical channel and the fourth logical channel are used to replicate packet data convergence protocol PDCP data, and selecting only one logical channel from the third logical channel and the fourth logical channel as a logical channel in the k logical channels.

In some possible implementations, the selecting only one logical channel from the third logical channel and the fourth logical channel as a logical channel in the k logical channels comprises selecting the third logical channel from the third logical channel and the fourth logical channel as the logical channel in the k logical channels when a first condition is satisfied.

In some possible implementations, the first condition comprises there is no to-be-transmitted data on the fourth logical channel.

In some possible implementations, the first condition comprises there is to-be-transmitted data on both the third logical channel and the fourth logical channel.

In some possible implementations, the first condition comprise the third logical channel is correlated to the first carrier.

In some possible implementations, a correlation between the third logical channel and the first carrier is determined by the terminal device, or a correlation between the third logical channel and the first carrier is determined by the network device.

In some possible implementations, the third logical channel and the fourth logical channel are determined by the terminal device, or the third logical channel and the fourth logical channel are determined by the network device.

According to a second aspect, a terminal device is provided. The terminal device has m logical channels and a plurality of carriers, each of the m logical channels is configured with a priority, each of the plurality of carriers is correlated to a priority of at least one of the m logical channels, and m>0; and the terminal device comprises a transceiver unit, configured to receive radio link control RLC data on n logical channels, wherein the n logical channels belong to the m logical channels, and m≥n>0, and a processing unit, configured to determine k logical channels in the n logical channels according to priorities of the n logical channels and a priority correlated to a first carrier in the plurality of carriers, wherein n≥k>0; and generate a media access control MAC protocol data unit PDU, wherein the MAC PDU comprises RLC PDUs on the k logical channels.

According to a third aspect, a terminal device is provided. The terminal device has m logical channels and a plurality of carriers, each of the m logical channels is configured with a priority, each of the plurality of carriers is correlated to a priority of at least one of the m logical channels, and m>0; and the terminal device comprises a transceiver, configured to receive radio link control RLC data on n logical channels, wherein the n logical channels belong to the m logical channels, and m≥n>0; and a processor, configured to determine k logical channels in the n logical channels according to priorities of the n logical channels and a priority correlated to a first carrier in the plurality of carriers, wherein n≥k>0; and generate a media access control MAC protocol data unit PDU, wherein the MAC PDU comprises RLC PDUs on the k logical channels.

According to a fourth aspect, a chip is provided, and is configured to perform the method according to any possible implementation of the first aspect.

In some possible implementations, the chip includes a processor, configured to invoke a computer program from a memory and run the computer program, wherein the computer program comprises an instruction used to perform the method according to any possible implementation of the first aspect.

In some possible implementations, the chip further includes the memory.

According to a fifth aspect, a computer readable medium is provided, and is configured to store a computer program.

The computer program includes an instruction used to perform the method according to any possible implementation of the first aspect.

According to a sixth aspect, a data generation method is provided, and is applied to a terminal device. The terminal device is configured with a third logical channel, a fourth logical channel, and at least one carrier, and the third logical channel and the fourth logical channel are used to replicate packet data convergence protocol PDCP data; and the method comprises generating a media access control MAC protocol data unit PDU for a first carrier in the at least one carrier when a first condition is satisfied, wherein the MAC PDU comprises an RLC PDU of the third logical channel in the third logical channel and the fourth logical channel.

In some possible implementations, the first condition comprises there is no to-be-transmitted data on the fourth logical channel.

In some possible implementations, the first condition comprises there is to-be-transmitted data on both the third logical channel and the fourth logical channel.

In some possible implementations, the first condition comprises the third logical channel is correlated to the first carrier.

In some possible implementations, a correlation between the third logical channel and the first carrier is determined by the terminal device, or a correlation between the third logical channel and the first carrier is determined by the network device.

In some possible implementations, the third logical channel and the fourth logical channel are determined by the terminal device, or the third logical channel and the fourth logical channel are determined by the network device.

According to a seventh aspect, a terminal device is provided. The terminal device is configured with a third logical channel, a fourth logical channel, and at least one carrier, and the third logical channel and the fourth logical channel are used to replicate packet data convergence protocol PDCP data; and the terminal device comprises a processing unit, configured to generate a media access control MAC protocol data unit PDU for a first carrier in the at least one carrier when a first condition is satisfied, wherein the MAC PDU comprises an RLC PDU of the third logical channel in the third logical channel and the fourth logical channel.

According to an eighth aspect, a terminal device is provided. The terminal device is configured with a third logical channel, a fourth logical channel, and at least one carrier, and the third logical channel and the fourth logical channel are used to replicate packet data convergence protocol PDCP data; and the terminal device comprises a processor, configured to generate a media access control MAC protocol data unit PDU for a first carrier in the at least one carrier when a first condition is satisfied, wherein the MAC PDU comprises an RLC PDU of the third logical channel in the third logical channel and the fourth logical channel.

According to a ninth aspect, a chip is provided, and is configured to perform the method according to any possible implementation of the first aspect.

In some possible implementations, the chip includes a processor, configured to invoke a computer program from a memory and run the computer program, wherein the computer program comprises an instruction used to perform the method according to any possible implementation of the sixth aspect.

In some possible implementations, the chip further includes the memory.

According to a tenth aspect, a computer readable medium is provided, and is configured to store a computer program. The computer program includes an instruction used to perform the method according to any possible implementation of the sixth aspect.

According to an eleventh aspect, a method for configuring a logical channel is provided. The method is applied to a terminal device, the terminal device is configured with at least one logical channel, the at least one logical channel includes a first logical channel, and the first logical channel is correlated to at least one first reliability requirement.

In some possible implementations, the method further comprises determining, according to a correlation between a logical channel group configured by a network and at least one second reliability requirement, whether to correlate the first logical channel to the logical channel group.

In some possible implementations, the determining, according to a correlation between a logical channel group configured by a network and at least one second reliability requirement, whether to correlate the first logical channel to the logical channel group comprises determining to correlate the first logical channel to the logical channel group when the at least one second reliability requirement comprises at least one of the at least one first reliability requirement.

In some possible implementations, the determining, according to a correlation between a logical channel group configured by a network and at least one second reliability requirement, whether to correlate the first logical channel to the logical channel group comprises determining not to correlate the first logical channel to the logical channel group when the at least one second reliability requirement does not comprise the at least one first reliability requirement.

In some possible implementations, the method further comprises triggering a data cache report according to a reliability requirement correlated to the at least one logical channel.

In some possible implementations, the triggering a data cache report according to a reliability requirement correlated to the at least one logical channel comprises when data arrives on the first logical channel, triggering the data cache report if a reliability requirement correlated to the first logical channel is higher than that of another logical channel already having to-be-transmitted data.

In some possible implementations, the another logical channel already having the to-be-transmitted data and the first logical channel are for a same target address.

In some possible implementations, the another logical channel already having the to-be-transmitted data is correlated to the logical channel group.

In some possible implementations, the first logical channel is correlated to the logical channel group.

In some possible implementations, the logical channel group correlated to the first logical channel is different from a logical channel group correlated to the another logical channel already having the to-be-transmitted data.

In some possible implementations, a reliability requirement correlated to the logical channel group correlated to the first logical channel is higher than a reliability requirement of the logical channel group correlated to the another logical channel already having the to-be-transmitted data.

According to a twelfth aspect, a terminal device is provided. The terminal device is configured with at least one logical channel, the at least one logical channel includes a first logical channel, and the first logical channel is correlated to at least one first reliability requirement.

According to a thirteenth aspect, a computer readable medium is provided, and is configured to store a computer program. The computer program includes an instruction used to perform the method embodiment according to the eleventh aspect.

According to a fourteenth aspect, a chip is provided, and is configured to perform the data generation method according to the eleventh aspect and various implementations thereof.

In some possible implementations, the chip includes a processor, configured to invoke a computer program from a memory and run the computer program, wherein the computer program comprises an instruction used to perform the method according to any possible implementation of the sixth aspect.

In some possible implementations, the chip further includes the memory.

According to a fifteenth aspect, a communications system is provided, and includes the foregoing terminal device.

According to a sixteenth aspect, a computer program product is provided, and includes a computer program instruction, where the computer program instruction enables a computer to perform the method according to any one of the foregoing method embodiments or any implementation thereof.

According to a seventeenth aspect, a computer program is provided. When the computer program is run on a computer, the computer is enabled to perform the method according to any one of the foregoing method embodiments or any implementation thereof.

DETAILED DESCRIPTION OF THE INVENTION

With the evolution of the mobile internet of things technology, eV2X is extended to a multi-carrier scenario, that is, a terminal device can receive and send data simultaneously on more than one carrier. Therefore, how to select a carrier is an urgent problem to be resolved. Therefore, embodiments of the present invention provide a data generation method, so that a terminal device can effectively select, from a plurality of carriers based on a data priority, a carrier used to generate data.

The technical solutions in the embodiments of the present invention are described below with reference to the accompanying drawings.

The embodiments of the present invention may be applicable to any terminal device-to-terminal device communications framework, such as vehicle to vehicle (V2V), vehicle to everything (V2X), and device to device (D2D). That is, the vehicle terminal-to-vehicle terminal system framework shown in FIG. 1 or FIG. 2 is merely an example of the embodiments of the present invention, and the embodiments of the present invention are not limited thereto.

The terminal device, also referred to as an access terminal, in the embodiments of the present invention may be any device or apparatus provided with a physical layer and a media access control layer, such as user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device or a computing device having a wireless communication function, another linear processing device, vehicle device, or wearable device connected to a wireless modem, or the like. The embodiments of the present invention are described by using a vehicle terminal as an example, but are not limited thereto.

A method used by a terminal device to obtain a transmission resource in the embodiments of the present invention is described below.

Figure 3:
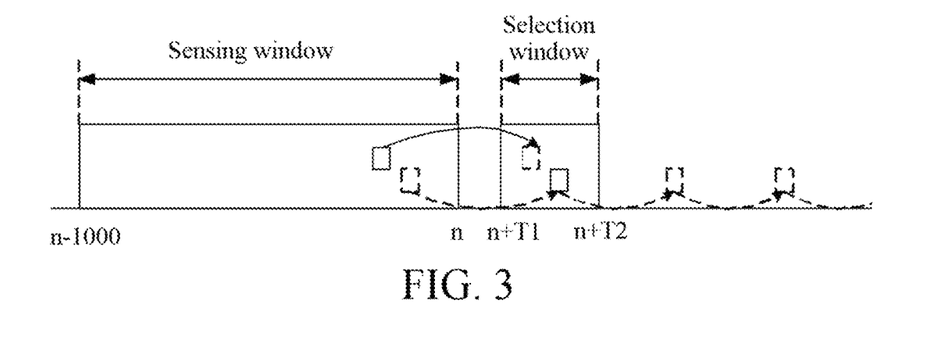
FIG. 3 is a schematic flowchart of a resource pool listening method according to an embodiment of the present invention.

FIG. 3 is a schematic flowchart of a method used by the terminal device to sense a resource pool according to an embodiment of the present invention.

As shown in FIG. 3, each carrier is assumed to correspond to at least one sidelink process (sidelink process). For example, in 3GPP Rel-14, one carrier corresponds to two sidelink processes. When a new data packet arrives at a moment n, the terminal device needs to select a resource. The terminal selects a resource in an interval of [n+T1, n+T2] according to a sensing result in a past period (for example, 1s). Specifically, the terminal device may select a resource in a selection window by using channel quality information corresponding to the resource detected in a sensing window.

T1≤4 ms, and 20 ms≤T2≤100 ms.

In addition, the channel quality information corresponding to the resource may be channel quality (such as receiving power or receiving quality) of a physical sidelink shared channel (PSSCH) corresponding to a physical sidelink control channel (PSCCH). The terminal device may alternatively perform received signal strength indicator (RSSI) detection on resources in a transmission resource set, and obtain channel quality information corresponding to each resource in the transmission resource set.

It should be noted that value ranges of T1 and T2 are only used as an example, and are not intended to limit this embodiment.

Because a service in the internet of vehicles system has periodicity, in this embodiment of the present invention, the terminal device may use a semi-static transmission manner.

Specifically, when the terminal device selects a resource for transmission, the terminal device continuously uses and reserves this resource for Cresel times, where 1 is subtracted from Cresel each time data transmission is performed. When Cresel becomes 0, the terminal randomly generates a random number within [0, 1], and compares the number with a parameter (probResourceKeep). If the number is greater than the parameter, the terminal reselects a resource, and if the number is less than the parameter, the terminal continues to use the resource, and resets Cresel.

That is, the terminal device adds, to currently transmitted control information, information about a resource reserved for a next transmission, so that another terminal device can determine, by detecting the control information of the terminal device, whether this resource is reserved or used by the terminal device, so as to reduce resource contention. In other words, after selecting a transmission resource, the terminal device in this embodiment of the present invention may continuously use the resource in a plurality of transmission periods, to reduce resource reselection and resource contention probabilities.

It should be understood that the method used the terminal device to sense the resource pool shown in FIG. 3 is an exemplary description for obtaining the resource by the terminal device, and this embodiment of the present invention is not specifically limited thereto. For example, a network device may alternatively allocate a resource for the terminal device.

An data generation method in the embodiments of the present invention is described below.

Figure 4:
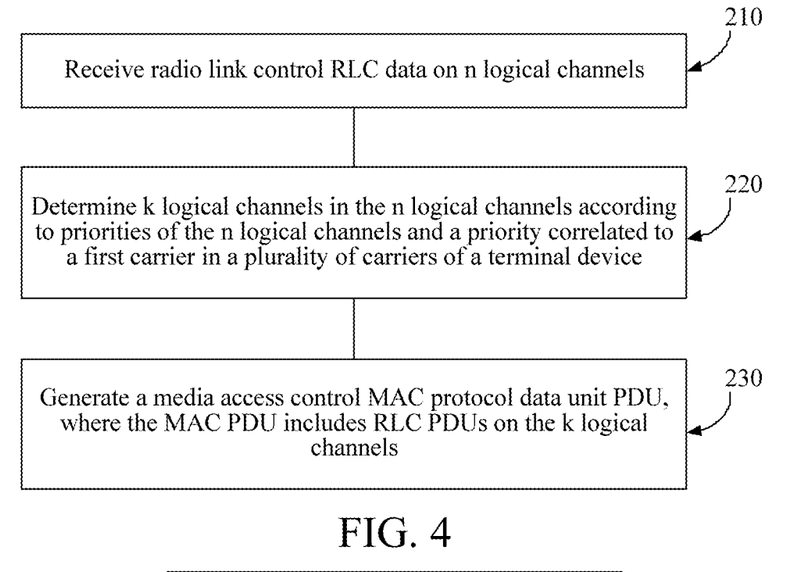
FIG. 4 is a schematic flowchart of a data generation method according to an embodiment of the present invention.

FIG. 4 is a schematic flowchart of a data generation method according to an embodiment of the present invention.

As shown in FIG. 4, the method includes the following steps.

210. Receive radio link control (Radio Link Control, RLC) data on n logical channels.

220. Determine k logical channels in the n logical channels according to priorities of the n logical channels and a priority correlated to a first carrier in a plurality of carriers of a terminal device.

230. Generate a media access control (Media Access Control, MAC) protocol data unit (Protocol Data Unit, PDU), wherein the MAC PDU comprises RLC PDUs on the k logical channels.

Specifically, the terminal device receives the radio link control RLC data on the n logical channels, wherein the n logical channels belong to the m logical channels, and m≥n>0; determines the k logical channels in the n logical channels according to the priorities of the n logical channels and the priority correlated to the first carrier in the plurality of carriers, wherein n≥k>0; and generates the media access control MAC protocol data unit PDU, wherein the MAC PDU comprises the RLC PDUs on the k logical channels.

In a word, the terminal device selects the k logical channels from the n logical channels, and generates, based on the k logical channels, the MAC PDU transmitted on the first carrier.

It should be noted that, a MAC PDU packaging rule is related to a priority of data.

Therefore, there is a prerequisite for the data generation method in this embodiment of the present invention, that is, the terminal device configures the m logical channels and the plurality of carriers, where each of the m logical channels is configured with a priority, each of the plurality of carriers is correlated to a priority of at least one of the m logical channels, and m>0.

Therefore, when receiving the RLC data on the n logical channels, the terminal device can select the k logical channels from the n logical channels according to the priorities of the n logical channels and the priority correlated to the first carrier in the plurality of carriers of the terminal device, and then generates the MAC PDU transmitted on the first carrier.

A person skilled in the art may understand that, data that enters each sublayer and that has not been processed is referred to as a service data unit (service data unit, SDU), and data with a particular format formed after being processed on a sublayer is referred to as a protocol data unit (Protocol Data Unit, PDU).

That is, a PDU formed on a current layer is an SDU on a next layer.

For example, each logical channel of the terminal device has an RLC entity (RLC entity), and data received by the RLC entity from a MAC layer or data sent by the RLC entity to a MAC layer may be referred to as an RLC PDU (or MAC SDU).

An implementation of determining the k logical channels in the n logical channels by the terminal device in this embodiment of the present invention is described below.

Optionally, in an embodiment, the terminal device may determine the k logical channels in the n logical channels, wherein a priority of each of the k logical channels belongs to the priority correlated to the first carrier.

Specifically, when generating the MAC PDU, the terminal device may determine the k logical channels in the n logical channels, wherein the priority of each of the k logical channels belongs to the priority correlated to the first carrier, and then generates, based on the k logical channels, the MAC PDU transmitted on the first carrier.

It should be noted that, in the prior art, the terminal device generates the MAC PDU according to a specific principle. For example, when a priority of an RLC SDU in the MAC PDU includes X, it is assumed that X is higher than Y, Y is higher than Z, and both Y and Z are priorities of logical channels of the terminal device. In this case, the MAC PDU also includes RLC SDUs whose priorities are Y and Z.

Therefore, to improve compatibility and applicability of the data generation method in this embodiment of the present invention and the prior art, in this embodiment of the present invention, a priority correlated to each of the plurality of carriers of the terminal device may be designed with reference to a packaging rule of a MAC PDU in the prior art. In this way, a current MAC PDU generation process can remain unchanged, thereby improving compatibility of the present invention and the prior to the maximum extent.

By way of example but not limitation, each of the plurality of carriers may be correlated to a priority of a logical channel according to the following rule:

When a priority correlated to a second carrier in the plurality of carriers comprises a priority of a first logical channel, the priority correlated to the second carrier further comprises a priority that is of a logical channel in the m logical channels and that is lower than the priority of the first logical channel. The second carrier is any one of the plurality of carriers, and the first logical channel is any one of the m logical channels.

That is, when the priority correlated to the second carrier is determined, once it is determined that the second carrier is correlated to the priority X, all priorities lower than X should be correlated to the second carrier.

For example, it is assumed that the terminal device has eight logical channels, and each logical channel corresponds to one priority. For example, it is assumed that a priority of a logical channel 1 is 1, a priority of a logical channel 2 is 2, and by analog, a priority of a logical channel 8 is 8. If the terminal device has three carriers, for example, a carrier 1, a carrier 2, and a carrier 3, the three carriers may be correlated to priorities of logical channels in the following forms:

Priorities correlated to the carrier 1 include 1, 2, 3, 4, 5, 6, 7, and 8.

Priorities correlated to the carrier 3 include 5, 6, 7, and 8.

Priorities correlated to the carrier 4 include 7 and 8.

It should be understood that, in this embodiment of the present invention, when determining the k logical channels in the n logical channels, the terminal device can determine the k logical channels by analyzing the priority correlated to the first carrier includes priorities of which of the n logical channels. The terminal device may alternatively determine the k logical channels in another manner. This is not specifically limited in this embodiment of the present invention.

Examples are provided below for description.

Optionally, in an embodiment, the terminal device may determine the k logical channels by analyzing priorities of some of the n logical channels.

Specifically, the terminal device may first determine a second logical channel in the n logical channels, wherein a priority of the second logical channel belongs to the priority correlated to the first carrier; and then determine the k logical channels according to the priority of the second logical channel. The second logical channel in this embodiment of the present invention may be any logical channel that is in the n logical channel and that has a priority correlated to the first carrier. More specifically, the terminal device may determine the k logical channels by comparing the priority correlated to the first carrier with priorities of some of the n logical channels.

For example, the terminal device may determine, in the n logical channels, logical channels having priorities lower than the priority of the second logical channel as the k logical channels.

For another example, the terminal device may determine, in the n logical channels, logical channels having priorities higher than the priority of the second logical channel as the k logical channels.

In this case, each of the plurality of carriers may be correlated to a priority of a logical channel according to the following rule:

priorities correlated to the plurality of carriers do not overlap.

For example, it is assumed that the terminal device has eight logical channels, and each logical channel corresponds to one priority. For example, it is assumed that a priority of a logical channel 1 is 1, a priority of a logical channel 2 is 2, and by analog, a priority of a logical channel 8 is 8. If the terminal device has three carriers, for example, a carrier 1, a carrier 2, and a carrier 3, the three carriers may be correlated to priorities of logical channels in the following forms:

Priorities correlated to the carrier 1 include 1, 2, 3, and 4.

Priorities correlated to the carrier 2 include 5 and 6.

Priorities correlated to the carrier 3 include 7 and 8.

In this embodiment of the present invention, only the priority of the second logical channel is compared with the priority correlated to the first carrier, to determine the MAC PDU transmitted on the first carrier, which does not conflict with a MAC PDU packaging rule in the prior art. Therefore, compatibility between this embodiment of the present invention and the prior art can be improved to the greatest extent.

In another embodiment, the terminal device may determine the k logical channels by comparing the priority correlated to the first carrier with a priority of each of the n logical channels.

For example, the terminal device determines the k logical channels in the n logical channels, wherein a priority of each of the k logical channels is lower than the priority correlated to the first carrier.

For another example, the terminal device determines the k logical channels in the n logical channels, wherein a priority of each of the k logical channels is higher than the priority correlated to the first carrier.

In this case, each of the plurality of carriers may be correlated to a priority of a logical channel according to the following rule:

each of the plurality of carriers is merely correlated to one priority.

For example, it is assumed that the terminal device has eight logical channels, and each logical channel corresponds to one priority. For example, it is assumed that a priority of a logical channel 1 is 1, a priority of a logical channel 2 is 2, and by analog, a priority of a logical channel 8 is 8. If the terminal device has three carriers, for example, a carrier 1, a carrier 2, and a carrier 3, the three carriers may be correlated to priorities of logical channels in the following forms:

A priority correlated to the carrier 1 includes 1.

A priority correlated to the carrier 2 includes 5.

A priority correlated to the carrier 3 includes 7.

In this embodiment of the present invention, only the priority of each of the n logical channels is compared with the priority correlated to the first carrier, to determine the MAC PDU transmitted on the first carrier, which does not conflict with a MAC PDU packaging rule in the prior art. Therefore, compatibility between this embodiment of the present invention and the prior art can be improved to the greatest extent.

It should be understood that, various digits in this embodiment are only for example, and this embodiment of the present invention is intended for describing an implementation of correlating a carrier to a priority of a logical channel, and an implementation of determining a carrier for transmitting the MAC PDU in a MAC PDU packaging process of the terminal device.

In an embodiment of the present invention, a data generation method applicable to a packet data convergence protocol (PDCP) data replication scenario is further provided. The method is applied to a terminal. The terminal device is configured with a third logical channel, a fourth logical channel, and at least one carrier, and the third logical channel and the fourth logical channel are used to replicate packet data convergence protocol PDCP data. Optionally, the third logical channel and the fourth logical channel are correlated to a same PDCP entity, to support the PDCP entity to perform PDCP replication and transmission. Optionally, a priority of the third logical channel is the same as a priority of the fourth logical channel.

Specifically, the terminal device may generate a media access control (MAC) protocol data unit (PDU) for a first carrier in the at least one carrier when a first condition is satisfied, wherein the MAC PDU comprises an RLC PDU of the third logical channel in the third logical channel and the fourth logical channel.

Optionally, the first condition includes: there is no to-be-transmitted data on the fourth logical channel. In this case, the terminal device may preferentially transmit an RLC PDU of the fourth logical channel, and further optionally, may transmit the RLC PDU of the third logical channel after transmitting the RLC PDU of the fourth logical channel.

Optionally, the first condition includes: there is to-be-transmitted data on both the third logical channel and the fourth logical channel. In this case, the terminal device may preferentially transmit an RLC PDU of the third logical channel, and further optionally, may transmit an RLC PDU of the fourth logical channel after transmitting the RLC PDU of the third logical channel.

Optionally, the first condition includes: the third logical channel is correlated to the first carrier.

Optionally, a correlation between the third logical channel and the first carrier is determined by the terminal device, or a correlation between the third logical channel and the first carrier is determined by the network device.

Optionally, the third logical channel and the fourth logical channel are determined by the terminal device, or the third logical channel and the fourth logical channel are determined by the network device.

It should be further understood that, the data generation method in the PDCP data replication scenario may also be combined with the data generation method shown in FIG. 4. Specifically, the terminal device may determine a third logical channel and a fourth logical channel in the n logical channels, and then select only one logical channel from the third logical channel and the fourth logical channel as a logical channel in the k logical channels. For brevity, details are not described herein again.

That the terminal device determines the MAC PDU of the first carrier is described above by using an example. However, it should be noted that in this embodiment of the present invention, after the first carrier is determined, carrier re-selection may be further performed. An implementation in which the terminal device is allowed to perform carrier re-selection is described below by using an example.

Optionally, in an implementation, the terminal device may determine, according to a channel busy ratio of the first carrier and a first threshold, whether carrier re-election is allowed. For example, when the channel busy ratio of the first carrier is greater than the first threshold, the terminal device is allowed to perform carrier re-selection. For another example, when the channel busy ratio of the first carrier is less than or equal to the first threshold, the terminal device is not allowed to perform carrier re-selection. It should be understood that, that the terminal device determines, by using the channel busy ratio of the first carrier and the first threshold, whether carrier re-election is allowed is used as an example above. In another embodiment, the terminal device may alternatively determine, by using other information such as load of the first carrier and a corresponding threshold, whether the terminal device is allowed to perform carrier re-selection.

A value of the first threshold is described by using an example below.

Optionally, a priority of each logical channel is correlated to one threshold.

Optionally, the first threshold is a maximum value of thresholds correlated to priorities of the k logical channels.

Optionally, the first threshold is a minimum value of thresholds correlated to priorities of the k logical channels.

Optionally, the first threshold is a maximum value of a threshold correlated to the priority of the first carrier.

Optionally, the first threshold is a minimum value of a threshold correlated to the priority of the first carrier.

Optionally, the first threshold is a maximum value of thresholds correlated to the following priorities:

the priority correlated to the first carrier, and a priority lower than the priority correlated to the first carrier.

Optionally, the first threshold is a minimum value of thresholds correlated to the following priorities:

the priority correlated to the first carrier, and a priority lower than the priority correlated to the first carrier.

Optionally, the first threshold is a maximum value of thresholds correlated to the following priorities:

the priority correlated to the first carrier, and a priority higher than the priority correlated to the first carrier.

Optionally, the first threshold is a minimum value of thresholds correlated to the following priorities:

the priority correlated to the first carrier, and a priority higher than the priority correlated to the first carrier.

In addition, an embodiment of the present invention further provides a method for configuring a logical channel. The method for configuring a logical channel may be applied to a terminal device. The method for configuring a logical channel can enable the terminal device to be configured with at least one logical channel. The at least one logical channel includes a first logical channel, and the first logical channel is correlated to at least one first reliability requirement.

It should be understood that, this embodiment of the present invention imposes no limitation on a specific representation of the reliability requirement. For example, a low value may represent a high reliability requirement. For another example, a high value may represent a low reliability requirement.

Optionally, the terminal device may determine, according to a correlation between a logical channel group configured by a network and at least one second reliability requirement, whether to correlate the first logical channel to the logical channel group.

For example, it is determined to correlate the first logical channel to the logical channel group when the at least one second reliability requirement comprises at least one of the at least one first reliability requirement.

For another example, it is determined not to correlate the first logical channel to the logical channel group when the at least one second reliability requirement does not comprise the at least one first reliability requirement.

Optionally, the terminal device may further trigger a data cache report according to a reliability requirement correlated to the at least one logical channel.

For example, when data arrives on the first logical channel, the data cache report is triggered if a reliability requirement correlated to the first logical channel is higher than that of another logical channel already having to-be-transmitted data.

In this embodiment of the present invention, that a reliability requirement correlated to the first logical channel is higher than another logical channel already having to-be-transmitted data is used as an example to describe an implementation of triggering the data cache report. However, it should be understood that, in another embodiment, when the data cache report is triggered, the terminal device further needs to satisfy another condition. Examples are provided below for description.

Optionally, the another logical channel already having the to-be-transmitted data and the first logical channel are for a same target address.

Optionally, the another logical channel already having the to-be-transmitted data is correlated to the logical channel group.

Optionally, the first logical channel is correlated to the logical channel group.

Optionally, the logical channel group correlated to the first logical channel is different from a logical channel group correlated to the another logical channel already having the to-be-transmitted data.

Optionally, a reliability requirement correlated to the logical channel group correlated to the first logical channel is higher than a reliability requirement of the logical channel group correlated to the another logical channel already having the to-be-transmitted data.

Figure 5:
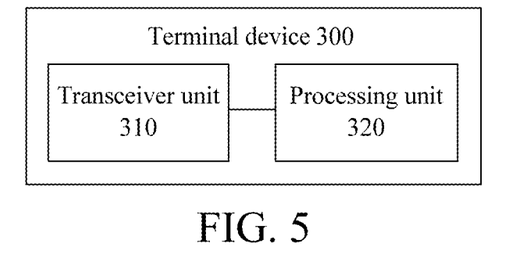
FIG. 5 is a schematic block diagram of a terminal device according to an embodiment of the present invention.

FIG. 5 is a schematic block diagram of a terminal device according to an embodiment of the present invention. It should be understood that, the terminal device in this embodiment of the present invention has m logical channels and a plurality of carriers, each of the m logical channels is configured with a priority, each of the plurality of carriers is correlated to a priority of at least one of them logical channels, and m>0.

As shown in FIG. 5, the terminal device 300 includes:

a transceiver unit 310, configured to receive radio link control RLC data on n logical channels, wherein the n logical channels belong to the m logical channels, and m≥n>0; and a processing unit 320, configured to:

determine k logical channels in the n logical channels according to priorities of the n logical channels and a priority correlated to a first carrier in the plurality of carriers, wherein n≥k>0; and generate a media access control MAC protocol data unit PDU, wherein the MAC PDU comprises RLC PDUs on the k logical channels.

Optionally, the processing unit 320 is specifically configured to:

determine the k logical channels in the n logical channels, wherein a priority of each of the k logical channels belongs to the priority correlated to the first carrier.

Optionally, when a priority correlated to a second carrier in the plurality of carriers comprises a priority of a first logical channel in the m logical channels, the priority correlated to the second carrier further comprises a priority that is of a logical channel in the m logical channels and that is lower than the priority of the first logical channel.

Optionally, the processing unit 320 is specifically configured to:

determine a second logical channel in the n logical channels, wherein a priority of the second logical channel belongs to the priority correlated to the first carrier; and determine the k logical channels according to the priority of the second logical channel.

Optionally, the processing unit 320 is further specifically configured to:

determine, in the n logical channels, logical channels having priorities lower than the priority of the second logical channel as the k logical channels.

Optionally, the processing unit 320 is further specifically configured to:

determine, in the n logical channels, logical channels having priorities higher than the priority of the second logical channel as the k logical channels.

Optionally, priorities correlated to the plurality of carriers do not overlap.

Optionally, the processing unit 320 is specifically configured to:

determine the k logical channels in the n logical channels, wherein a priority of each of the k logical channels is lower than the priority correlated to the first carrier.

Optionally, the processing unit 320 is specifically configured to:

determine the k logical channels in the n logical channels, wherein a priority of each of the k logical channels is higher than the priority correlated to the first carrier.

Optionally, each of the plurality of carriers is merely correlated to one priority.

Optionally, the priority correlated to each of the plurality of carriers is a priority configured by a network device.

Optionally, the priority correlated to each of the plurality of carriers is a preconfigured priority.

Optionally, the processing unit 320 is further configured to:

determine, according to a channel busy ratio of the first carrier and a first threshold, whether carrier re-election is allowed.

Optionally, a priority of each logical channel is correlated to one threshold.

Optionally, the first threshold is a maximum value of thresholds correlated to priorities of the k logical channels.

Optionally, the first threshold is a minimum value of thresholds correlated to priorities of the k logical channels.

Optionally, the first threshold is a maximum value of a threshold correlated to the priority of the first carrier.

Optionally, the first threshold is a minimum value of a threshold correlated to the priority of the first carrier.

Optionally, the first threshold is a maximum value of thresholds correlated to the following priorities:

the priority correlated to the first carrier, and a priority lower than the priority correlated to the first carrier.

Optionally, the first threshold is a minimum value of thresholds correlated to the following priorities:

the priority correlated to the first carrier, and a priority lower than the priority correlated to the first carrier.

Optionally, the first threshold is a maximum value of thresholds correlated to the following priorities:

the priority correlated to the first carrier, and a priority higher than the priority correlated to the first carrier.

Optionally, the first threshold is a minimum value of thresholds correlated to the following priorities:

the priority correlated to the first carrier, and a priority higher than the priority correlated to the first carrier.

In addition, a terminal device that is for generating data and that is applicable to a packet data convergence protocol (PDCP) data replication scenario is provided. The terminal device is configured with a third logical channel, a fourth logical channel, and at least one carrier, and the third logical channel and the fourth logical channel are used to replicate packet data convergence protocol PDCP data. The terminal device may include a processing unit, configured to generate a media access control MAC protocol data unit PDU for a first carrier in the at least one carrier when a first condition is satisfied, wherein the MAC PDU comprises an RLC PDU of the third logical channel in the third logical channel and the fourth logical channel. Optionally, the third logical channel and the fourth logical channel are correlated to a same PDCP entity, and support the PDCP entity to perform PDCP replication and transmission.

Optionally, a priority of the third logical channel is the same as a priority of the fourth logical channel.

Optionally, the first condition includes: there is no to-be-transmitted data on the fourth logical channel. In this case, the terminal device may preferentially transmit an RLC PDU of the fourth logical channel, and further optionally, may transmit the RLC PDU of the third logical channel after transmitting the RLC PDU of the fourth logical channel.

Optionally, the first condition includes: there is to-be-transmitted data on both the third logical channel and the fourth logical channel. In this case, the terminal device may preferentially transmit an RLC PDU of the third logical channel, and further optionally, may transmit an RLC PDU of the fourth logical channel after transmitting the RLC PDU of the third logical channel.

Optionally, the first condition includes: the third logical channel is correlated to the first carrier.

Optionally, a correlation between the third logical channel and the first carrier is determined by the terminal device, or a correlation between the third logical channel and the first carrier is determined by the network device.

Optionally, the third logical channel and the fourth logical channel are determined by the terminal device, or the third logical channel and the fourth logical channel are determined by the network device.

Optionally, the terminal device shown in FIG. 5 may also be combined with the terminal device that is applied to the PDCP data replication scenario. For brevity, details are not described herein again.

Optionally, the terminal device shown in FIG. 5 may be alternatively configured with at least one logical channel. The at least one logical channel includes a first logical channel, and the first logical channel is correlated to at least one first reliability requirement.

Optionally, the terminal device includes:

a processing unit 320, configured to determine, according to a correlation between a logical channel group configured by a network and at least one second reliability requirement, whether to correlate the first logical channel to the logical channel group.

Optionally, the processing unit 320 is specifically configured to:

determine to correlate the first logical channel to the logical channel group when the at least one second reliability requirement comprises at least one of the at least one first reliability requirement.

Optionally, the processing unit 320 is specifically configured to:

determine not to correlate the first logical channel to the logical channel group when the at least one second reliability requirement does not comprise the at least one first reliability requirement.

Optionally, the terminal device further includes a transceiver unit 310, and the transceiver unit 310 is configured to trigger a data cache report according to a reliability requirement correlated to the at least one logical channel.

Optionally, the transceiver unit 310 is specifically configured to:

when data arrives on the first logical channel, trigger the data cache report if a reliability requirement correlated to the first logical channel is higher than that of another logical channel already having to-be-transmitted data.

Optionally, the another logical channel already having the to-be-transmitted data and the first logical channel are for a same target address.

Optionally, the another logical channel already having the to-be-transmitted data is correlated to the logical channel group.

Optionally, the first logical channel is correlated to the logical channel group.

Optionally, the logical channel group correlated to the first logical channel is different from a logical channel group correlated to the another logical channel already having the to-be-transmitted data.

Optionally, a reliability requirement correlated to the logical channel group correlated to the first logical channel is higher than a reliability requirement of the logical channel group correlated to the another logical channel already having the to-be-transmitted data.

Figure 6:
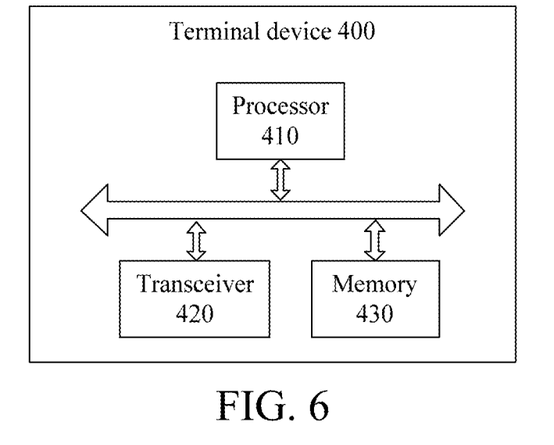
FIG. 6 is a schematic block diagram of another terminal device according to an embodiment of the present invention.

In this embodiment of the present invention, the transceiver unit 310 may be implemented by a transceiver, and the processing unit 320 may be implemented by a processor. As shown in FIG. 6, a terminal device 400 may include a processor 410, a transceiver 420, and a memory 430. The memory 430 may be configured to store indication information, and may further be configured to store code, instructions, and the like to be executed by the processor 410. Various components of the terminal device 400 are connected to each other by using a bus system. In addition to including a data bus, the bus system further includes a power bus, a control bus, and a status signal bus.

The terminal device 400 shown in FIG. 6 can implement various processes implemented by the terminal device in the method embodiment of FIG. 4. To avoid repetition, details are not described herein again. That is, the method embodiment in the embodiments of the present invention may be applied in the processor or be implemented by the processor.

Figure 7:
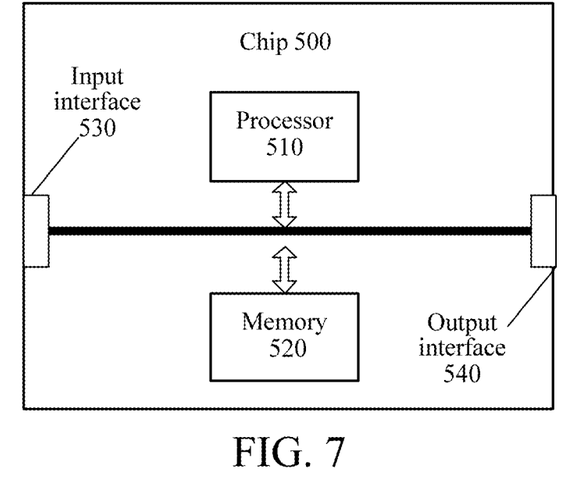
FIG. 7 is a schematic block diagram of a chip according to an embodiment of the present invention.

FIG. 7 is a schematic structural diagram of a chip according to an embodiment of this application. The chip 500 shown in FIG. 7 includes a processor 510. The processor 510 may invoke a computer program from a memory and run the computer program, to implement the method in the embodiments of this application.

Optionally, as shown in FIG. 7, the chip 500 may further include a memory 520. The processor 510 may invoke the computer program from the memory 520 and run the computer program, to implement the method in the embodiments of this application.

The memory 520 may be a component independent of the processor 510, or may be integrated into the processor 510.

Optionally, the chip 500 may further include an input interface 530. The processor 510 may control the input interface 530 to communicate with another device or chip, and specifically, may obtain information or data sent by another device or chip.

Optionally, the chip 500 may further include an output interface 540. The processor 510 may control the output interface 540 to communicate with another device or chip, and specifically, may output information or data to another device or chip.

Optionally, the chip may be applied to the network device in the embodiments of this application, and the chip can implement corresponding procedures implemented by the network device in various methods in the embodiments of this application. For brevity, details are not described herein again.

Optionally, the chip may be applied to the terminal device in the embodiments of this application, and the chip can implement corresponding procedures implemented by the terminal device in various methods in the embodiments of this application. For brevity, details are not described herein again.

It should be noted that, the chip mentioned in the embodiments of this application may also be referred to as a system-level chip, a system chip, a chip system, a system on chip, or the like.

In an implementation process, steps in the foregoing method embodiments in the embodiments of the present invention can be completed by using a hardware integrated logical circuit in the processor, or by using instructions in a form of software. More specifically, steps of the methods disclosed with reference to the embodiments of the present invention may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It should be understood that, the processor in the embodiments of the present invention may be an integrated circuit chip, has a signal processing capability, and can implement or perform various methods, steps, and logical block diagrams disclosed in the embodiments of the present invention. For example, the processor may be a general-purpose processor, a digital signal processor (DSP), an application-specific integrated circuit (ASIC), a field-programmable gate array (FPGA), or another programmable logic device, a transistor logic device, a discrete hardware component, or the like. The general purpose processor may be a microprocessor or the processor may be any conventional processor or the like.

In addition, it may be understood that the memory mentioned in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. It should be understood that, the memory is an example but is not intended for limitation. For example, the memory in the embodiments of the present invention may alternatively be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct rambus random access memory (DR RAM), and the like. That is, the memory of the systems and methods described in this specification includes but is not limited to those and any memory of another proper type.

Finally, it should be noted that, terms used in the embodiments of the present invention and appended claims are merely intended to describe particular embodiments rather than limit the embodiments of the present invention.

The terms "a", "said", and "the" of singular forms used in the embodiments and the appended claims of the present invention are also intended to include plural forms, unless otherwise specified in the context clearly.

For another example, terms such as the first carrier and the second carrier may be used in the embodiments of the present invention. However, these carriers shall not be limited to these terms. The terms are merely used to distinguish between the carriers.

For another example, depending on context, the word "when" used herein may be explained as "if", "in response to determining" or "in response to detecting". Similarly, depending on context, the phase "if determining" or "if detecting (a condition or event for description)" may be explained as "when determining" or "in response to determining" or "when detecting (a condition or event for description)" or "in response to detecting (a condition or event for description)".

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the embodiments of the present invention.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units can be selected according to actual needs to achieve the objective of the embodiments of the present invention.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the embodiments of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or some of the steps of the method described in the embodiments of the present invention. The foregoing storage medium includes any medium that can store program code, such as a USB flash drive, a removable hard disk, a read-only memory, a random access memory, a magnetic disk, or an optical disc.

The foregoing content is merely specific implementations of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A data generation method applied to a terminal device, wherein the terminal device has m logical channels and a plurality of carriers, each of the m logical channels is configured with a priority, each of the plurality of carriers is correlated to a priority of at least one of the m logical channels, and m>0, and the method comprises:
   receiving radio link control RLC data on n logical channels, wherein the n logical channels belong to the m logical channels, and m≥n>0;
   determining k logical channels in the n logical channels according to priorities of the n logical channels and a priority correlated to a first carrier in the plurality of carriers, wherein n≥k>0; and
   generating a media access control (MAC) protocol data unit (PDU), wherein the MAC PDU comprises RLC PDUs on the k logical channels.

2. The data generation method of claim 1 wherein determining k logical channels in the n logical channels according to priorities of the n logical channels and a priority correlated to a first carrier in the plurality of carriers comprises determining the k logical channels in the n logical channels, wherein a priority of each of the k logical channels belongs to the priority correlated to the first carrier.

3. The data generation method of claim 1 wherein when a priority correlated to a second carrier in the plurality of carriers comprises a priority of a first logical channel in the m logical channels, the priority correlated to the second carrier further comprises a priority that is of a logical channel in the m logical channels and that is lower than the priority of the first logical channel.

4. The data generation method of claim 1 wherein determining k logical channels in the n logical channels according to priorities of the n logical channels and a priority correlated to a first carrier in the plurality of carriers comprises:
   determining a second logical channel in the n logical channels, wherein a priority of the second logical channel belongs to the priority correlated to the first carrier; and
   determining the k logical channels according to the priority of the second logical channel.

5. The data generation method of claim 1 further comprising determining,
   according to a channel busy ratio of the first carrier and a first threshold, whether carrier re-election is allowed.

6. The data generation method of claim 5 wherein a priority of each logical channel is correlated to one threshold.

7. The data generation method of claim 5 wherein the first threshold is a minimum value of a threshold correlated to the priority of the first carrier.

8. A terminal device including:
   m logical channels and a plurality of carriers, wherein each of the m logical channels is configured with a priority, each of the plurality of carriers is correlated to a priority of at least one of them logical channels, and m>0;
   one or more processors; and
   one or more memories storing computer-readable instructions that, upon execution by the one or more processors, configure the terminal device to:
   receive radio link control RLC data on n logical channels, wherein the n logical channels belong to the m logical channels, and m≥n>0;
   determine k logical channels in the n logical channels according to priorities of the n logical channels and a priority correlated to a first carrier in the plurality of carriers, wherein n≥k>0; and
   generate a media access control (MAC) protocol data unit (PDU), wherein the MAC PDU comprises RLC PDUs on the k logical channels.

9. The terminal device of claim 8 wherein determining k logical channels in the n logical channels according to priorities of the n logical channels and a priority correlated to a first carrier in the plurality of carriers comprises determining the k logical channels in the n logical channels, wherein a priority of each of the k logical channels belongs to the priority correlated to the first carrier.

10. The terminal device of claim 8 wherein, when a priority correlated to a second carrier in the plurality of carriers comprises a priority of a first logical channel in the m logical channels, the priority correlated to the second carrier further comprises a priority that is of a logical channel in the m logical channels and that is lower than the priority of the first logical channel.

11. The terminal device of claim 8 wherein determining k logical channels in the n logical channels according to priorities of the n logical channels and a priority correlated to a first carrier in the plurality of carriers comprises:
   determining a second logical channel in the n logical channels, wherein a priority of the second logical channel belongs to the priority correlated to the first carrier; and
   determining the k logical channels according to the priority of the second logical channel.

12. The terminal device of claim 8 wherein the computer-readable instructions further configure the terminal device to determine, according to a channel busy ratio of the first carrier and a first threshold, whether carrier re-election is allowed.

13. The terminal device of claim 12 wherein a priority of each logical channel is correlated to one threshold.

14. The terminal device of claim 12 wherein the first threshold is a minimum value of a threshold correlated to the priority of the first carrier.

* * * * *